Patented May 23, 1950

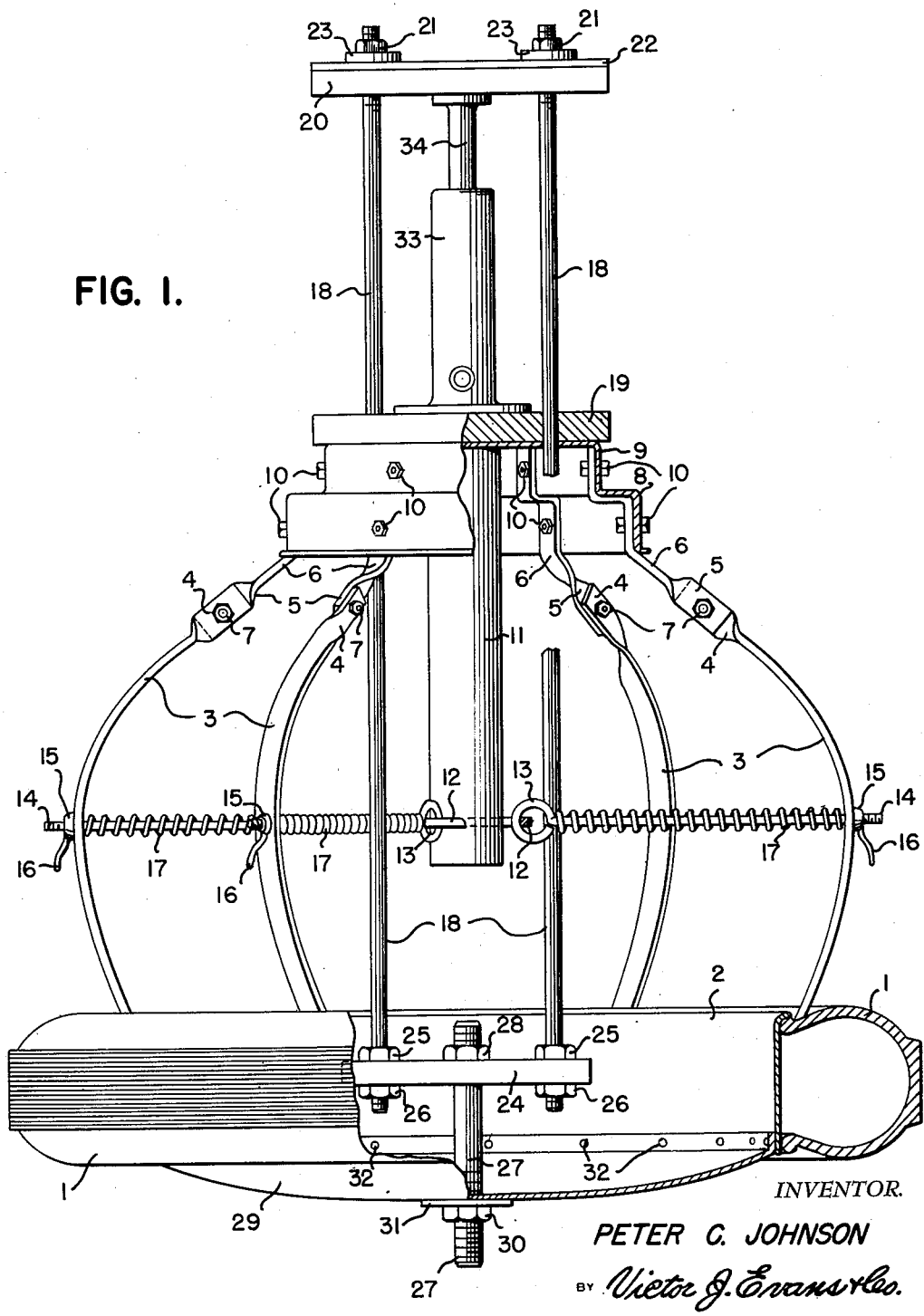

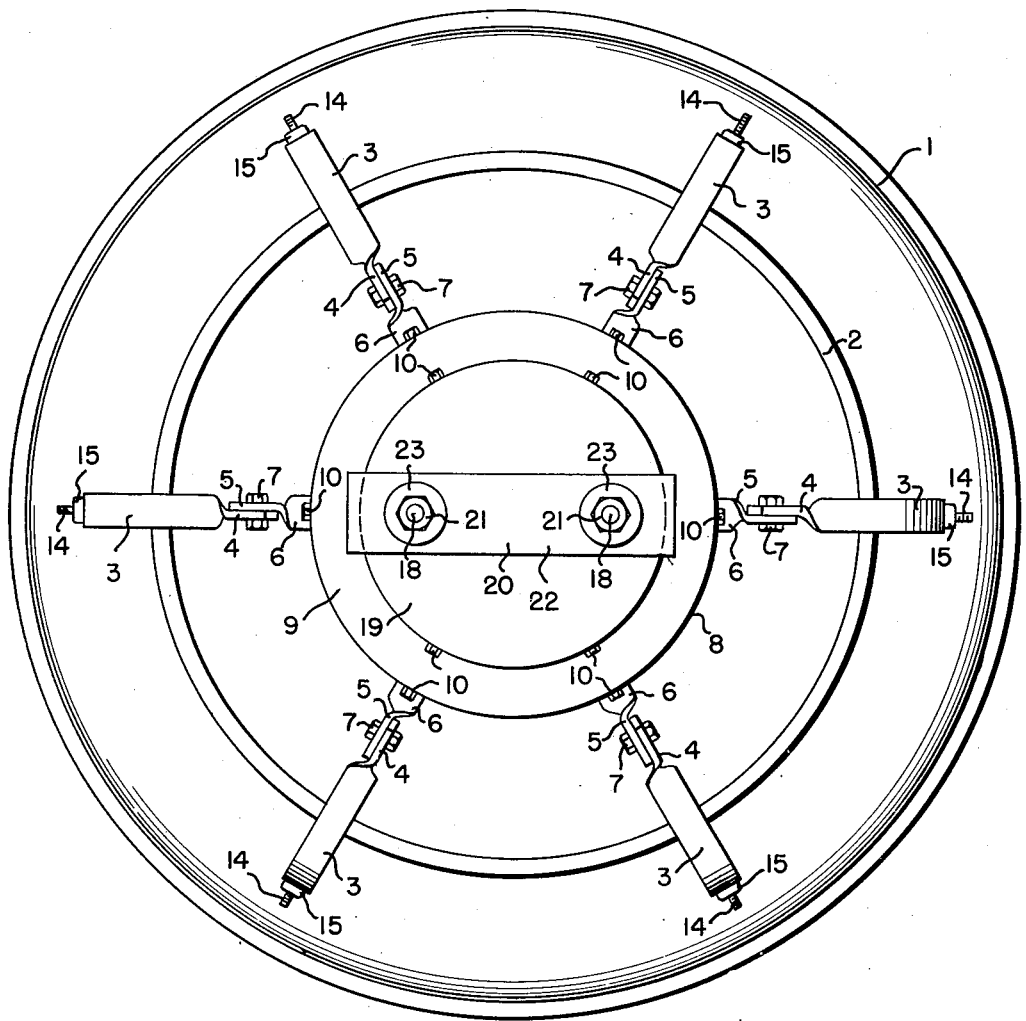

2,508,520

UNITED STATES PATENT OFFICE 2,508,520

AXIALLY SHIFTING TYPE JACK OPERATED TIRE REMOVER

Peter C. Johnson, Lanesboro, Minn.

Application April 26, 1946, Serial No. 665,155

3 Claims. (Cl. 157—1.2)

This invention relates to a device for removing tires from wheels. At the present time it is very difficult to remove the tires from the wheels of busses, trucks and other large vehicles, and it is therefore one object of the invention to provide a device by means of which a large tire may be easily broken loose from the rim of a wheel and removed from the wheel.

Another object of the invention is to provide a tire removing device so constructed that a pneumatic or hydraulic jack may be used for applying force and detaching the tire from the wheel rim.

Another object of the invention is to provide a tire removing device wherein arms are carried by a disk and held in position for applying pressure to the bead of a tire so that as the arms are forced downwardly and wheel rim pulled upwardly the tire will be broken loose from the rim and removal of the tire from the rim made very easy.

Another object of the invention is to provide a tire removing device which is simple in construction, very strong, and easy to operate.

The invention is illustrated in the accompanying drawings wherein:

Figure 1 is a side view showing the tire removing device in position for use.

Figure 2 is a top plan view of the tire removing device.

This improved tire removing device is intended for removing a tire 1 from the rim 2 of a wheel for a bus, truck or other large motor vehicle. After the rim has been removed from the wheel it is placed upon the floor of a garage or upon the ground and the tire removing device disposed vertically over the rim and the tire with the ends of the arms 3 bearing against the bead of the tire as shown in Figure 1. These arms are formed from strips of resilient metal such as steel which are curved longitudinally and have their upper ends twisted to form ears 4 which are secured flat against the side faces of the twisted lower ends 5 of strips 6 by bolts 7. The strips 6 are bent to provide portions which fit flat against the inner face of the flange 8 of a disk 9 which is similar in construction to a brake drum and bolts 10 secure the strips 6 to the disk. Since the disk has been bent to form the flange 8 and the upper portions of the strips are bent as shown in Figure 1 the strips will be braced against transverse tilting movement and they will be firmly secured and held spaced from each other circumferentially of the disk. A metal tube 11 is disposed vertically under the disk 9 where it is welded or otherwise firmly secured at the center of the disk and about the lower portion of this tube is disposed a ring 12 which passes through eyes 13 at inner ends of rods 14. The rods have threaded outer free end portions which slidably pass through openings formed in the arms 3 and carry nuts 15 having handles 16 so that they may be easily turned and adjust the arms relative to the rods. When the nuts are tightened the springs 17 coiled about the rods will be compressed between the arms and the eyes 12 of the rods and the lower ends of the arms held firmly against the flange of the rim and thus prevented from slipping out of contact with the heel or bead of the tire. Rods or posts 18 extend vertically through the disk 9 and a block 19 which rests upon the disk and upper ends of the rods 18 pass through a bar 20 where they are secured by nuts 21. The cross bar 20 is reinforced by a metal plate 22 and washers 23 are placed under the nuts so that the nuts may be tightened without the plate and the cross bar being subjected to wear. Lower ends of the rods or posts 18 pass through a cross bar 24 which is firmly held upon the rods by nuts 25 and 26 having engagement with its upper and lower faces and midway its length the bar 24 is formed with an opening through which passes a rod 27. A nut 28 which is screwed upon the upper end of the rod 27 engages the bar 24 and prevents disengagement of the bar from the rod. The lower portion of the stem or rod 27 passes through a disk 29 and carries a nut 30 and a washer 31, and since the disk is secured to the rim 2 by fasteners 32 or the disk may have its edge portion engage across the edge of the rim.

When this tire removing device is in use a jack 33, which is preferably a hydraulic jack, is set upon the disk 19 with its plunger 34 under the bar 20 midway the length thereof. As the plunger is shifted upwardly upward pressure is applied to the bar 20 and downward pressure applied to the disk 19 and disk 9. Therefore the arms 3 will be urged downwardly and the disk 29 and the rim 2 urged upwardly and the tire will be broken loose from the rim and shoved off of the lower edge of the rim from which the tire engaging bead or flange has previously been removed. The fact that the arms 3 are curved longitudinally and formed of resilient metal allows them to have sufficient give to prevent damage to a tire which is subjected to pressure and the fact that the upper ends of the arms are connected with the strips 6 by bolts 7 permits arms to be removed and others substituted when necessary. The twists in the arms and the strips reinforces them and prevents the arms from being bent out of the desired bowed shape.

Having thus described the invention what is claimed is:

1. A tire removing device comprising a disk, strips spaced from each other circumferentially of the disk and extending radially from the disk at a downward incline, longitudinally bowed tire engaging arms of resilient material extending downwardly from said strips, said arms having their upper portions twisted and the outer end portions of the strips being also twisted, bolts passing through the twisted end portions of the arms and the strips and securing companion arms and strips to each other, posts disposed vertically and slidably passing through the disk, a cross bar carried by and extending between the upper ends of said posts whereby a jack may be placed upon the disk and have the upper end of its plunger engaged with the under face of the cross bar, a tube mounted centrally of said disk and extending downwardly therefrom, a ring about the lower portion of said tube, rods carried by said ring and extending radially therefrom with their outer end portions passing through said arms in spaced relation to the lower ends of the arms, nuts screwed upon the protruding ends of said rods, springs about the rods and having their outer ends abutting the arms, a cross bar carried by the lower ends of said posts, a pin carried by the lower cross bar midway the length thereof and extending downwardly for passing through an opening at the center of a side disk of a rim carrying a tire against which the lower ends of the arms bear.

2. A tire removing device comprising a carrier, strips spaced from each other circumferentially of the carrier and projecting radially therefrom, tire engaging arms carried by said strips and extending downwardly therefrom and bowed longitudinally, a centering device extending downwardly from the carrier, a ring about the centering device, rods carried by said ring and projecting radially therefrom with their outer end portions passing through said arms, nuts carried by the protruding outer ends of the rods, springs about said rods urging the arms outwardly, posts slidable vertically through said carrier, a cross bar carried by the lower ends of said posts and provided with means for engaging through a side disk of a wheel rim from which a tire is to be removed, and a cross bar carried by the upper ends of the posts whereby a jack may be set upon the carrier with its plunger engaging the upper cross bar, and the posts urged upwardly while the carrier and the arms are urged downwardly to dislodge a tire from a rim.

3. A tire removing device comprising a carrier, tire-engaging arms bowed longitudinally and having upper ends connected with said carrier, a ring, rods extending outwardly from said ring and having outer ends passing through said arms, nuts upon said rods engaging the outer faces of the arms, springs about the rods urging the arms outwardly, posts slidable vertically through the carrier and having means at their lower ends for connecting the posts with a side disk of a rim from which a tire is to be removed, and a cross member carried by the upper ends of the posts and spaced upwardly from the carrier whereby a jack may be placed between the carrier and the cross member and pressure applied to shift the posts upwardly and shift the carrier and the arms downwardly to force a tire off of a rim while the rim is urged upwardly.

PETER C. JOHNSON.

REFERENCES CITED

The following references are of record in the file of this patent:

UNITED STATES PATENTS

| Number | Name | Date |
|---|---|---|
| 1,641,083 | Hite | Aug. 30, 1927 |
| 1,724,813 | Weaver et al. | Aug. 13, 1929 |
| 1,890,746 | O'Dell | Dec. 13, 1932 |
| 1,948,434 | Stafford et al. | Feb. 20, 1934 |
| 2,228,086 | Rodgers | Jan. 7, 1941 |
| 2,401,118 | Talley et al. | May 28, 1946 |
| 2,406,996 | Colley | Sept. 3, 1946 |
| 2,436,003 | Gosselin | Feb. 17, 1948 |
| 2,470,107 | Piacenti | May 17, 1949 |